United States Patent [19]

Iguma et al.

[11] Patent Number: 4,669,823
[45] Date of Patent: Jun. 2, 1987

[54] OPTICAL SYSTEM DRIVE FOR OPTICAL RECORDING/REPRODUCING APPARATUS

[75] Inventors: Akira Iguma; Tadashi Okuda, both of Toyokawa, Japan

[73] Assignee: Hitachi, Ltd., Tokyo, Japan

[21] Appl. No.: 666,747

[22] Filed: Oct. 31, 1984

[30] Foreign Application Priority Data

Oct. 31, 1983 [JP] Japan .................. 58-202600

[51] Int. Cl.⁴ .............................................. G02B 26/10
[52] U.S. Cl. .................................. 380/255; 350/247; 369/45
[58] Field of Search ............... 267/169, 170, 178, 179; 74/20, 102–104, 108; 350/247, 255; 369/44, 45

[56] References Cited

U.S. PATENT DOCUMENTS

| 1,588,900 | 6/1926 | McGrath ........................ 267/169 |
| 4,117,997 | 10/1978 | Gitzendanner . |
| 4,495,407 | 1/1985 | Kodama et al. . |
| 4,554,653 | 11/1985 | Malissin et al. ................ 350/255 |
| 4,568,142 | 2/1986 | Iguma ............................ 350/255 |

FOREIGN PATENT DOCUMENTS

| 0053476 | 6/1982 | European Pat. Off. . |
| 0144445 | 6/1985 | European Pat. Off. . |
| 3324861 | 1/1985 | Fed. Rep. of Germany . |
| 56-80836 | 7/1981 | Japan . |
| 57-208641 | 12/1982 | Japan . |
| 58-146035 | 8/1983 | Japan . |
| 575069 | 2/1946 | United Kingdom . |
| 2067821 | 7/1981 | United Kingdom . |
| 2091902 | 8/1982 | United Kingdom . |

Primary Examiner—John K. Corbin
Assistant Examiner—Loha Ben
Attorney, Agent, or Firm—Antonelli, Terry & Wands

[57] ABSTRACT

An apparatus for electromagnetically driving an objective in conformance with movements of an optical disc in the vertical direction and deviations from track possibly produced in rotation of the disc, to thereby accomplish an automatic focussing of a write and/or read light beam on the disc. A driven unit including the objective lens system is supported by closely wound coil springs for suppressing unwanted resonance which will otherwise be produced in the driving operation. The apparatus is effective for controlling the focussed position of the light beam both in recording and reproducing modes. The spring coils are integrally mounted on a stationary mounting member by molding.

16 Claims, 32 Drawing Figures

RUBBER SUSPENSION

INITIAL TENSION

FIG. 5a
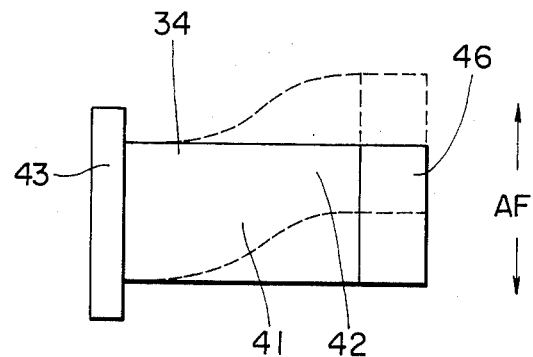
FIG. 5b    FIG. 5c
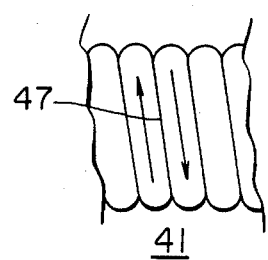   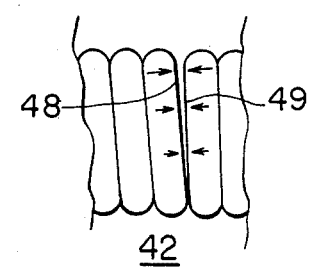
FIG. 6
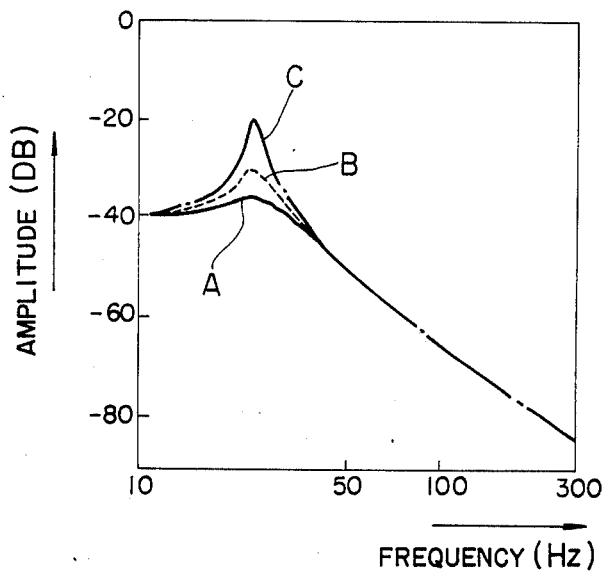

$\vec{F} = \vec{F}_1 + \vec{F}_2$

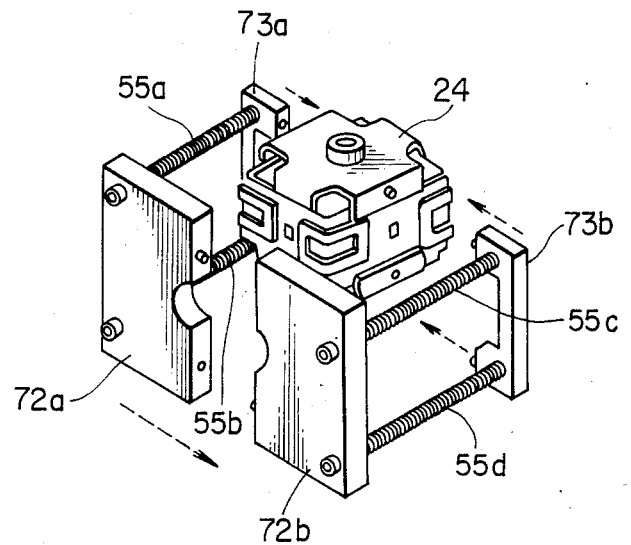
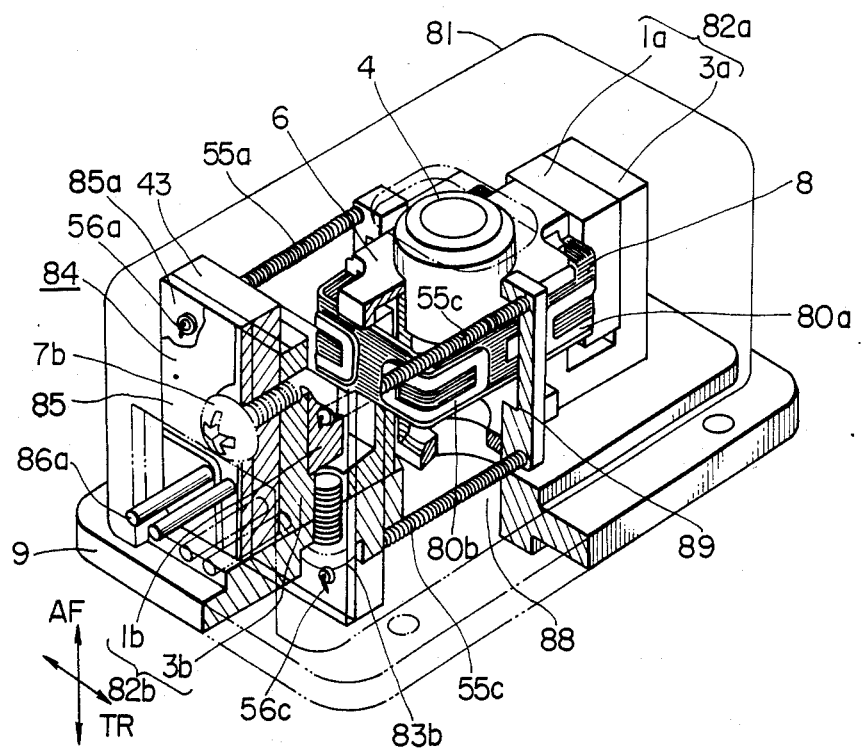

CROSS-SECTION A-A'

OPTICAL SYSTEM DRIVE FOR OPTICAL RECORDING/REPRODUCING APPARATUS

CROSS-REFERENCE OF RELEVANT PATENT APPLICATIONS

The present application relates to U.S. patent application Ser. No. 488,452 filed Apr. 26, 1983, now U.S. Pat. No. 4,568,142, and E.P.C. patent application No. 83104069.6 filed Apr. 26, 1983 in the name of Akira Iguma claiming priority on the basis of Japanese Utility Model Applications Nos. 59697/1982 and 61258/1982, respectively, both applications being assigned to the same assignee as the present application.

The present invention relates generally to an optical system driving apparatus for driving a driven unit including an objective lens in a direction corresponding to the optical axis of the objective as well as in direction perpendicular to the optical axis, for optically recording and/or reading on/or from a recording medium with aid of a light beam transmitted through the objective. In particular, the invention concerns an optical system driving apparatus which includes driven unit supporting coil springs for suppressing variations and rollings of the driven unit which take place as the driven unit is driven.

In the hitherto known optical recording/reproducing apparatus in which laser light is made use of, the laser light is focussed in a minute spot by means of an objective lens system upon signal recording and/or reading (detecting). For accomplishing the signal writing (recording) and/or detection (reading) with desired accuracy, there are required not only a focussing control for forming the focussed spot of the recording/reproducing light beam on an information recording medium in consideration of roughness or physical non-uniformity and vibration of the information recording medium but also a tracking control for causing the focussed light spot to trace constantly the correct signal track without fail. For realizing these so-called servo controls, it is required to provide an error detector for detecting errors involved in both the focussing control and the tracking control and a driving mechanism or actuator for moving the focussing objective or optical system in such a manner that the error can be cancelled.

In the case of the hitherto known driving mechanism of a so-called galvanometer type, the objective lens system is displaced in the direction corresponding to the optical axis thereof on one hand, while mirrors located on the optical path extending to the objective and having respective rotation axes orthogonal to each other are rotated on the other hand with the aid of so-called voice coil means, to thereby control the focussed spot position of laser light in the three independent directions. The driving mechanism or actuator of this type requires a heavy objective system of a large angle of view, e.g. an objective of 3.5° in the view angle, 4.5 mm in the focal length and 1.5 g in weight, resulting in that the overall size of the driving unit or apparatus is remarkably increased, to a disadvantage.

As an attempt to eliminate the drawback mentioned above, there has been proposed a method of vibrating the optical system including a light-weight objective having a small angle of view along the optical axis and in the directions perpendicular to the optical axis by utilizing an electric signal.

For driving electrically the objective two-dimensionally, it is possible to adopt a driving system in which electromagnetic means is employed, a driving system which is implemented by resorting to the use of the voice-coil means and a driving system in which piezoelectric elements are used. In any system as adopted, it is necessary to implement the driving means in a reduced size and weight.

In British Patent Application Publication GB No. 2,091,902A, there is disclosed a combination of magnetic circuits for driving an objective lens system in both the tracking direction and the focussing direction and suspension spring means for supporting the objective system.

Referring to FIG. 1 which shows a hitherto known actuator for driving an objective system (4), a magnetic circuit is constituted by magnetic yokes (3a, 3b) and magnets (1a, 1b) connected to the yokes for generating magnetic flux. The yokes (3a, 3b) are mounted on a mounting base (9) by means of screws (5a, 5b) where only the screw (5b) is shown.

The objective (4) is mounted on a focussing coil (8) by means of an objective holder (6). The focussing coil (8) is attached with a tracking coil (10) through bonding. Usually, the objective lens holder (6) is fitted with three or four lenses combined appropriately for reducing aberrations. The objective holder (6) is supported by means of spring holders (12a, 12b) which in turn are mounted on suspension springs (B) (14a, 14b; 16a, 16b) supported by means of a movable frame (18). The latter in turn is mounted on suspension springs (A) (20a, 20b; 22a, 22b) which are mounted on a stationary frame (23). (Members 12b, 14b, 16b, 22b are not shown.) Each of the springs (A) (20a, 20b; 22a; 22b) and the springs (B) (14a, 14b; 16a, 16b) is of a leaf-like configuration, wherein the former have planes extending horizontally orthogonally to the optical axis of the objective (4) while the latter have planes extending vertically and in parallel with the optical axis of the objective (4). A driven assembly or unit (24) composed of the objective (4), the focussing and tracking coils (8, 10) and the objective holder (6) is movable in the vertical direction due to flexure or deformation of the leaf springs (A) upon electrical energization of the focussing coil (8) and movable in the direction in a horizontal plane as indicated by an arrow (25) under flexure or deformation of the leaf springs (B) upon electrical energization of the tracking coil (10). In FIG. 1, even numerals denotes movable members while odd reference numerals are assigned to stationary members.

The apparatus shown in FIG. 1 suffers drawbacks mentioned below.

In general, when a supporting structure for the driven unit is constituted by metal rod members or plate-like members, the resonance sharpness ($Q_0$) at the minimum resonance frequency ($f_0$) (i.e. the lowest frequency at which resonance is produced) of the vibration of the driven unit is high, involving degradation in the response characteristic of the servo circuit for the driving means. This can be explained by the fact that mechanical energy to be changed into heat energy as internal loss in the metal members is too small to damp the resonance.

Referring to FIG. 2a, there is graphically illustrated relationship between amplitude and frequency (i.e. amplitude vis-a-vis frequency characteristic) or phase of the driven unit (24) mounted on a supporting structure constituted by the leaf springs (A, B) as described above. More specifically, the relationship between amplitude and frequency of vibration of the driven unit vibrated in the vertical or focussing direction is represented together with a phase characteristic B. Further, there are also illustrated acceleration C of the driven unit vibrated in the tracking direction and acceleration D of undersirable attendant cross action in the focussing direction. The response performance or characteristic of the driven unit in the focussing/tracking operations can be improved by a smaller value of $Q_0$, flatter amplitude-frequency and phase characteristics and reduced magnitude of the cross action attendant to the acceleration in the tracking/focussing direction. The cross action CA is understood as a leak composition in the focussing direction orthogonal to the tracking direction.

$$CA = \frac{\alpha_{AF \to TR}/F_{AF}}{\alpha_{TR \to TR}/F_{TR}}$$

where $\alpha_{AF \to TR}$ is an acceleration in the tracking direction when a driving force $F_{AF}$ in the focusing direction is operated and $\alpha_{TR \to TR}$ is an acceleration in the tracking direction when a driving force $F_{TR}$ in the tracking direction is operated.

In FIG. 2a, the level of amplitude of 0 dB is given by $3.16 \times 10^{-2}$ (m/v) where m is in meter and V represents a voltage applied to the coil, while the level of acceleration of 0 dB is given by $3.23 \times 10^{-3}$ (G/V) where G represents the gravitational acceleration.

As will be seen in FIG. 2a, the characteristic curves A, B and D suffer high peaks, respectively, which means poor response characteristic of the driven unit, resulting in appearance of some improper effect such as the resonance phenomenon caused by an amplitude peak at a frequency near 1 kHz.

It is therefore an object of the present invention to provide an objective lens driving apparatus which overcomes the shortcomings of the hitherto known apparatus described above is immune to the unwanted resonance phenomenon, and in which the control for focussing a light beam on an optical recording medium is facilitated.

Another object of the invention is to provide an objective driving apparatus which is provided with spring means for suppressing undesirable resonance.

Yet another object of the invention is to provide an objective supporting structure which is advantageously suited for use in a servo control for effecting tracking and focussing control in the optical recording or reproducing operation on or from a rotating recording medium.

A further object of the present invention is to provide an objective supporting mechanism or structure which can be manufactured on a mass production basis and assembled smoothly and easily with positional or angular error in the disposition of the objective lens being suppressed to a possible minimum.

In view of the above objects, there is provided according to an aspect of the present invention an objective driving apparatus in which a driven unit including an optical system is supported on a stationary frame by a plurality of coil springs spiralled or wound closely so that turns of the coil contact intimately each other the coil springs having one end fixedly connected to the driven unit and the other end fixedly mounted on a stationary frame.

The above and other objects, features and advantages of the invention will be more apparent upon consideration of the following description taken in conjunction with accompanying drawings:

FIGS. 5a to 5c are views for illustrating operation modes of a coil spring support provided according to the teaching of the invention;

FIG. 6 is a view for graphically illustrating operation characteristics of the objective driving apparatus according to an exemplary embodiment of the invention;

FIGS. 9 to 11 are views showing further embodiments of the invention; and

In the course of developing the objective lens driving apparatus aimed by the invention, the inventors once attempted to decrease the resonance sharpness $Q_0$ described hereinbefore by using the resilient or spring members for supporting the driven unit which members are made of a viscoelastic material such as rubber. In this case, the resonance sharpness $Q_0$ is obviously determined by the inherent damping property of a rubber material as used. In this connection, it has been experimentally established that in a low temperature range of 20° C. to 0° C. where the rubber material tends to be more solid, the lowest frequency $f_0$ at which resonance is produced becomes higher and that the value of $Q_0$ is increased, as the result of which the performance of the servo circuit is correspondingly degraded. Of course, a rubber material whose hardness undergoes less variation as a function of temperature may be used. However, the rubber material of this kind has in general a high hardness and is poor in the property for damping the unwanted resonance. Thus, it has been determined that the rubber material is not suited for use as the member for supporting the driven unit.

Besides, the rubber material is subjected to deterioration in the course of time lapse, giving rise to a problem with respect to the durability of the driven unit supporting member.

It is further to be noted that the supporting member made of a viscoelastic material has a great freedom of universal movement and thus provides a cause for the appearance of a rolling phenomenon. More specifically, due to only a slight unbalance in the driving force and deviation between the gravity of the driven unit and a point at which the driving force is applied, the driven unit is caused to move with attendant inclination of the objective system in the frequency band of the effective driving vibration, providing thus a great obstacle in realizing the desired servo performance in many practical applications.

Figure 3A:
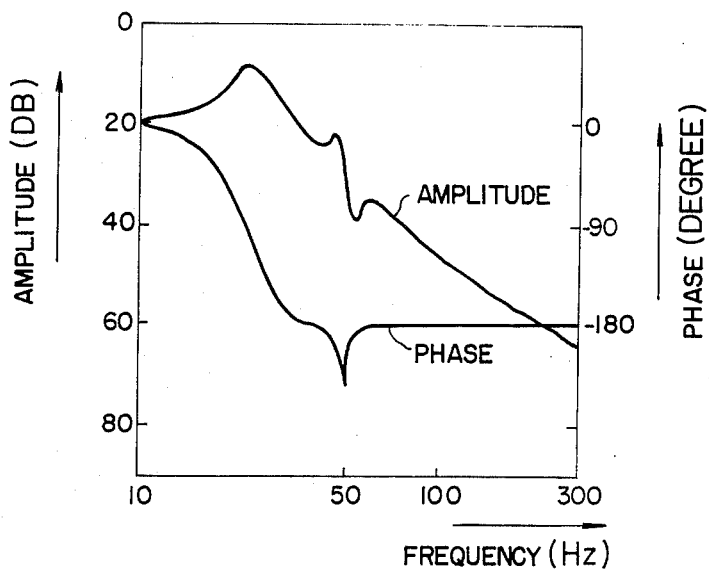
FIG. 3a is a view for graphically illustrating characteristics of an apparatus realized in the course of developing the objective driving apparatus according to the present invention.

FIG. 3a graphically illustrates the frequency characteristic of an objective system measured at the time the rolling phenomenon actually took place. It will be seen that a significant phase lag is produced in the vicinity of 50 Hz, often resulting in oscillation of the servo circuit as well as situations in which signals can not be reproduced in any satisfactory manner.

Figure 3B:
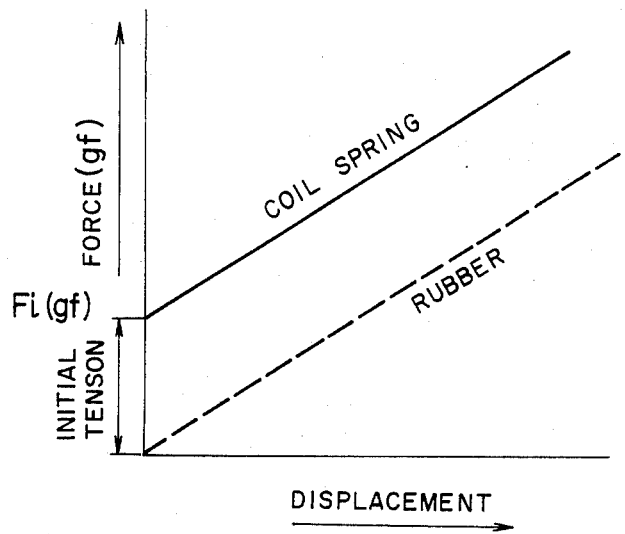
FIG. 3b is a view for graphically and comparatively illustrating basic operation of a driven unit supporting means according to the invention.

Further, since viscoelastic material has a small initial tension as indicated by a broken line in FIG. 3b and is susceptible to deformation under a force of negligible magnitude, great difficulty is encountered in assembling the driven unit in such a manner that no inclination of the objective system is produced. In general, error given in terms of inclination angle of the objective has to be restricted within ca. 0.3 degrees. It has been found that very expensive and troublesome assembling procedure is required in order to maintain the accuracy of this order, rendering impractical the manufacturing on the mass-production basis.

Figure 4A:
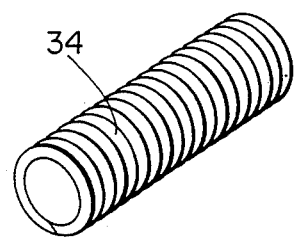
FIGS. 4a to 4c are views showing an exemplary embodiment of the present invention.
Figure 4B:
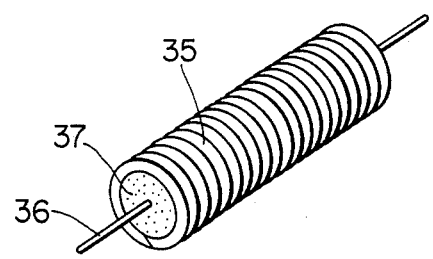
Figure 4C:
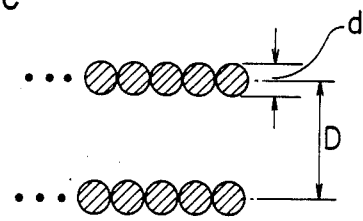

FIGS. 4a and 4b show in a perspective view a portion of the supporting member implemented according to the teachings of the invention. Referring to FIG. 4a which shows a first embodiment of the invention, a phosphor bronze wire 34 of ca. 0.1 mm φ in diameter d (FIG. 4c) is closely wound under torsion on a mandrel of 0.3 mm φ to 0.6 mm φ in diameter (not shown). By withdrawing the mandrel after the winding operation, there is finished a closely wound coil spring of a hollow cylindrical configuration having an outer diameter of 0.5 mm φ to 0.8 mm φ. Although the phosphor bronze wire is used in forming the coil spring in the illustrated embodiment of the invention in view of the fact that the phosphor bronze wire exhibits a high electric conductivity, that the connection of the wire to the focussing and tracking coils by soldering can be easily accomplished and that the wire can thus be advantageously used for conducting a lens control current, it should however be appreciated that wires of other materials such as beryllium copper, nickel silver, piano wire or the like can be equally used for forming the so-called close coil spring (i.e. closely or intimately spiralled coil), so far as the conditions as mentioned above are substantially satisfied. Further, the close spring coil can be manufactured according to any conventional method without resorting to the use of the mandrel. The close spring coil thus formed can be effectively used as the supporting spring member for supporting or suspending the driven unit including the objective according to the teaching of the invention. Experiments conducted by the inventors have shown that a close coil spring having an average diameter D (FIG. 4c) of 0.7 mm φ (equivalent to the outer diameter of 0.8 mm φ) which has been formed of a wire of 0.1 mm in diameter d, by way of example, has an initial tension $F_i$ of ca. 4 gf (gram-force) which is preferable for attaining the desired characteristic. The desirable ratio between the average diameter D of the coil spring and the diameter d of the wire, i.e. the ratio D/d should be in a range of 3 to 15. On the other hand, the desirable initial tension $F_i$ should be in a range of 1 to 15 gf. The minimum resonance frequency tends to increase with the initial tension $F_i$.

FIG. 4b shows in a perspective view a portion of a close coil spring 35 according to another embodiment of the invention. This coil spring 35 is made of a polyester elastomer wire. A lead conductor 36 for conducting a current to the focussing and tracking coils is disposed substantially coaxially within the hollow interior of the close coil spring 35 which is subsequently filled with a mass of silicon 37 having a good temperature characteristic to secure fixedly the lead conductor 36 at both ends of the coil spring 35. The coil spring 35 according to the instant embodiment of the invention may be formed of a wire of other non-conductive polymer. Besides, the coiled wire material may be stainless steel which is difficult to be soldered. The lead conductor 36 should preferably be coated with an insulation material. In that case, the silicon packing 37 may be omitted. The coil spring of a metal is operative for satisfactorily supporting the driven unit over a wide temperature range from −40° C. to 110° C., while the spring of polymer or high molecular compound material can assure an increased margin in the weight of the driven unit by virtue of light weight of the spring and thus allows a heavy objective system of a large size to be installed in the driven unit.

FIGS. 5a, 5b and 5c are side views for illustrating operation and effect of the closely wound coil spring support according to the invention. Referring to FIG. 5a, four coil springs 34 are disposed in a cantilever fashion, wherein one ends of these springs are mounted on the driven unit 46 while the other ends are fixedly secured to a stationary frame (corresponding to that indicated by 23 in FIG. 1). When the driven unit 46 (which may correspond to that shown in FIG. 1 and denoted by 24) is displaced upwardly in the focussing direction indicated by arrow AF as viewed in FIG. 5a, the springs 34 are subjected to deformation and occupy the position indicated by broken lines. Similar deformation is also produced when the driven unit is displaced downwardly as viewed in FIG. 5a.

FIGS. 5b and 5c show portions 41 and 42 of the coil spring 34 in fragmental enlarged views, respectively. Referring to FIG. 5b, it should be noted that vibration energy is transformed into heat at the portion or region 47 of the coil 34 because shearing friction is produced upon deformation of the coil between the adjacent turns of the coil which are in close contact with each other. On the other hand, at the region 42, there is produced a space between the mutually opposing side surfaces 48 and 49 of the adjacent turns. These opposing side surfaces 48 and 49 collide repetitively with each other in a seesaw-like fashion as indicated by arrows, as the direction of the deformation of the spring 34 is changed. The mechanical energy of these adjacent turns is also transformed into thermal energy. By virtue of the transformation of the mechanical energy into thermal energy mentioned above, the resonance sharpness $Q_0$ is effectively damped or attenuated.

In this manner, the value of $Q_0$ at the frequency $f_0$ can be reduced in the vibration of the driven unit in the operating direction.

FIG. 6 graphically illustrates amplitude vis-a-vis frequency characteristics of a driven unit of an objective driving apparatus supported by the coil springs which are of a substantially same configuration but differ from one another in the material. The characteristic curves A, B and C are measured in a range near to the frequency $f_0$ and plotted with the materials of the coil springs being taken as parameters.

More specifically, the curve A represents the amplitude vis-a-vis frequency characteristic of the driven unit supported by the closely wound coil springs of phosphor bronze shown in FIG. 4a, the curve B is for the supporting members made of viscoelastic silicon rubber of 1 mm in diameter, and the curve C is for the supporting members each constituted by a rod of phosphor bronze of 0.2 mm in diameter. It should be mentioned that the characteristic curves A, B and C shown in FIG. 6 are virtually aligned with each other in respect to the frequency $f_0$ by adjusting correspondingly the weight of the driven unit.

As will be seen in FIG. 6, the amplitude vis-a-vis frequency characteristic A of the driven unit supported by means of the spring coils according to the illustrated embodiment of the invention is advantageous over the others B and C in that the resonance sharpness $Q_0$ is improved by ca. 10 dB to 20 dB in magnitude.

Figure 7A:
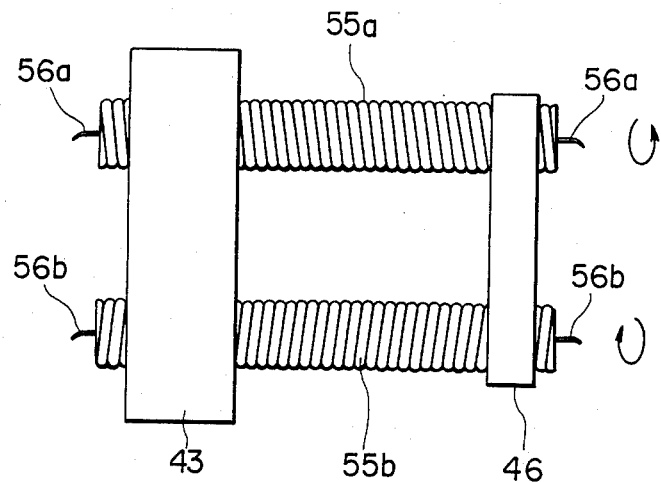
FIGS. 7a to 7d are views showing another exemplary embodiment of the invention and operation characteristics thereof.
Figure 7B:
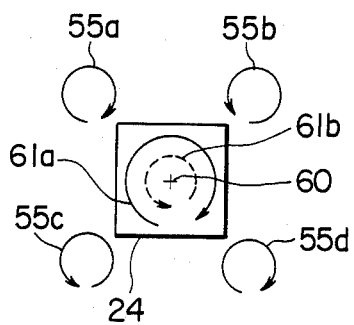

FIGS. 7a to 7d are views for illustrating comparatively the occurrence of the rolling phenomenon of the driven unit supported by the coil springs which are wound in different directions. More specifically, referring to FIGS. 7a and 7b, a pair of diametrically oppositely disposed coil springs 55a and 55d of the four springs 55a, 55b, 55c and 55d are both wound in a same direction, e.g. in right-hand or clockwise direction, while the other pair of the coil springs 55b and 55c are both wound in left-hand or counterclockwise direction. In FIG. 7a, reference numerals 56a and 56b denote lead wires which are connected to the AF (focussing) coil and the TR (tracking) coil, respectively, for supplying drive currents thereto.

Figure 7C:
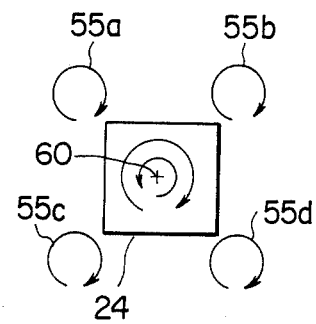
Figure 7D:
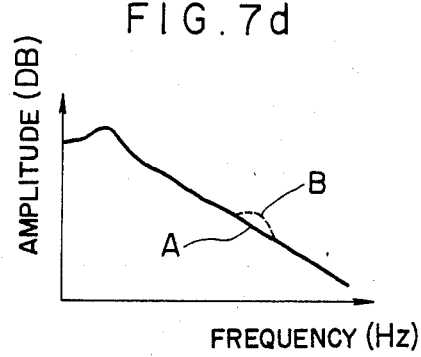

With the arrangement described above, the torque or rotation moment of the clockwise direction indicated by an arrow 61a produced about the center of rotation 60 of the driven unit 24 is forcibly resisted or suppressed by the left-handed closely wound coil springs 55b and 55c, while the counterclockwise rotation moment 61b is resisted by the right-handed wound coil springs 55a and 55c, resulting in a flat amplitude vis-a-vis frequency characteristic such as indicated by a curve A shown in FIG. 7d. In contrast, the broken curve B represents the corresponding characteristic of the driven unit which is, however, supported by the coil springs all of which are wound in the same direction as shown in FIG. 7c. It will be seen from comparison of the curves A and B that the rolling of the driven unit about the rotation center 60 is positively suppressed with the arrangement shown in FIG. 7b in which the diametrically disposed coil springs are wound in the same directions, whereby the ideal frequency response characteristic can be realized. This ideal characteristic remains substantially unchanged even when the AF coil and the TR coil are directly connected to the coil springs 55a to 55d without using the lead conductors 56a and 56b.

Figure 1:
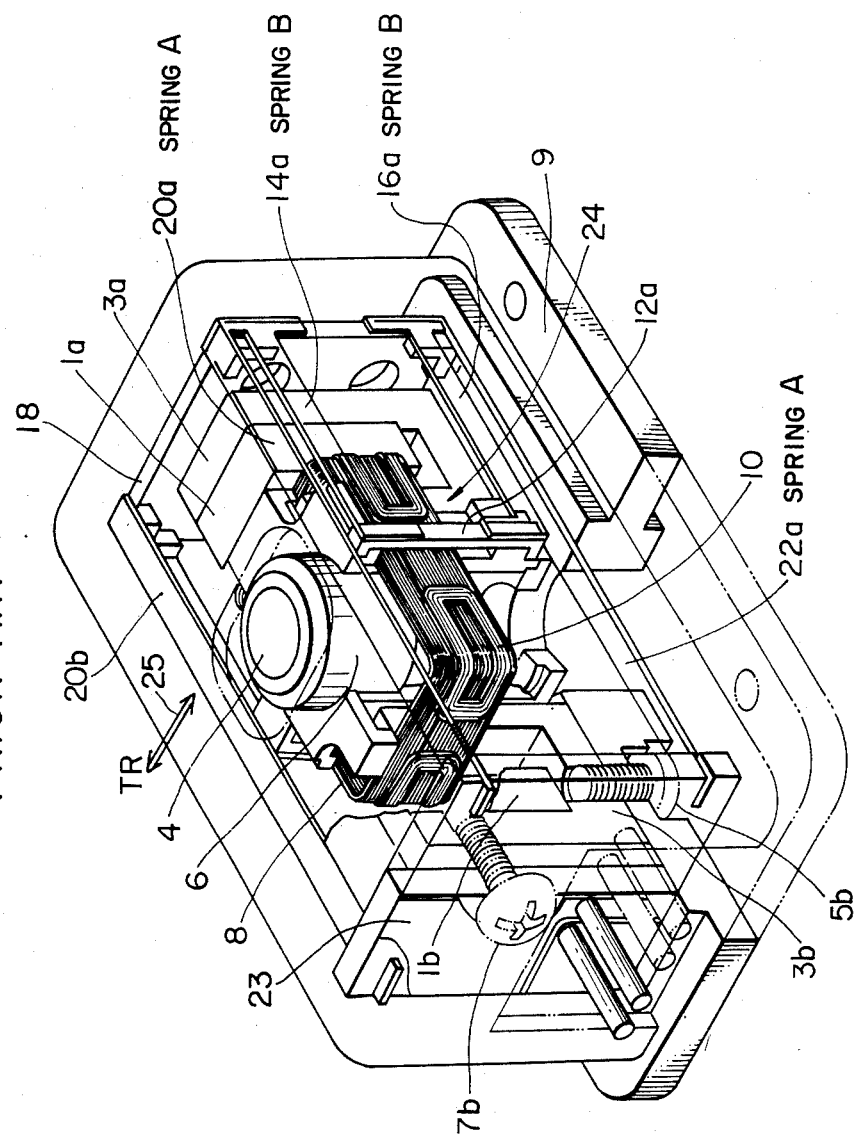
FIG. 1 shows in a perspective view a hitherto known objective lens driving apparatus.
Figure 8A:
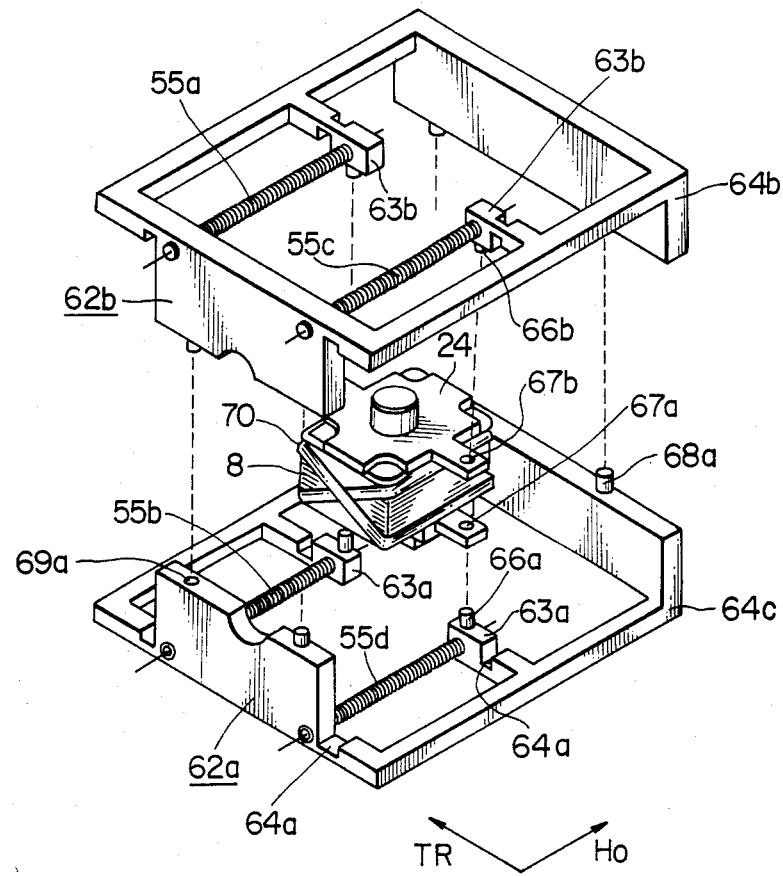
FIGS. 8a to 8c are views showing yet another embodiment of the invention.

FIG. 8a illustrates a manner in which the supporting members constituted by the closely wound coil springs 55a, 55b, 55c and 55d are mounted on the driven unit or body 24. Referring to FIG. 8a, the stationary frame is composed of two halves 62a and 62b and adapted to be mounted on a mount base 9 or alternatively on magnetic circuit elements 1a, 1b, 3a and 3b (FIG. 1). The lower stationary frame half 62a includes recesses 64a (the purpose of which will be described hereinafter), positioning studs 68a and holes 69a for receiving the positioning studs formed in the upper stationary frame half 62b, a pair of lateral projections 63a each provided with a positioning stud 66a for supporting thereon the driven unit 24, an assembling guide 64c adapted to be gripped by a robot hand for facilitating the assembling of the driven unit 24 and stationary frame halves 62a and 62b, and the coil springs 55b and 55d which are mounted, respectively, between an upstanding side wall and the projections 63a in an integrally molded structure. The upper stationary frame half 62b is of a similar structure. It will be noted that the upper and lower frame halves 62a and 62b are combined together unmovably with the positioning studs or posts 68a being fitted in the associated recesses or holes 69a. Simultaneously, the posts 66a and 66b formed integrally with the lateral projections 63a and 63b are, respectively, inserted in associated recesses 67a and 67b formed in the driven unit 24. The assembling guides 64b; 64c and/or the stationary frame halves 62a; 62b are of such size and a form that they can be gripped by a hand of an actuator assembling robot. It should be noted that the end portions of the coil springs 55a to 55d are prevented from free movement in the assembled state. The stationary frame half which may be realized in an integral structure through molding or the like process may be made of a thermoplastic material such as ABS, polycarbonate or the like. The positioning means 68a and 69a engaged with each other may be secured together through laser welding or ultrasonic welding process. After the assembling, the AF coil 8 and the TR coil 70 are connected to the lead wires 56a to 56d by soldering, and the assembling guide 64c is cut away at the recesses 64a (same holds true for the guide 64b). The recesses 64a facilitate the cutting of the assembling guide.

Figure 2A:
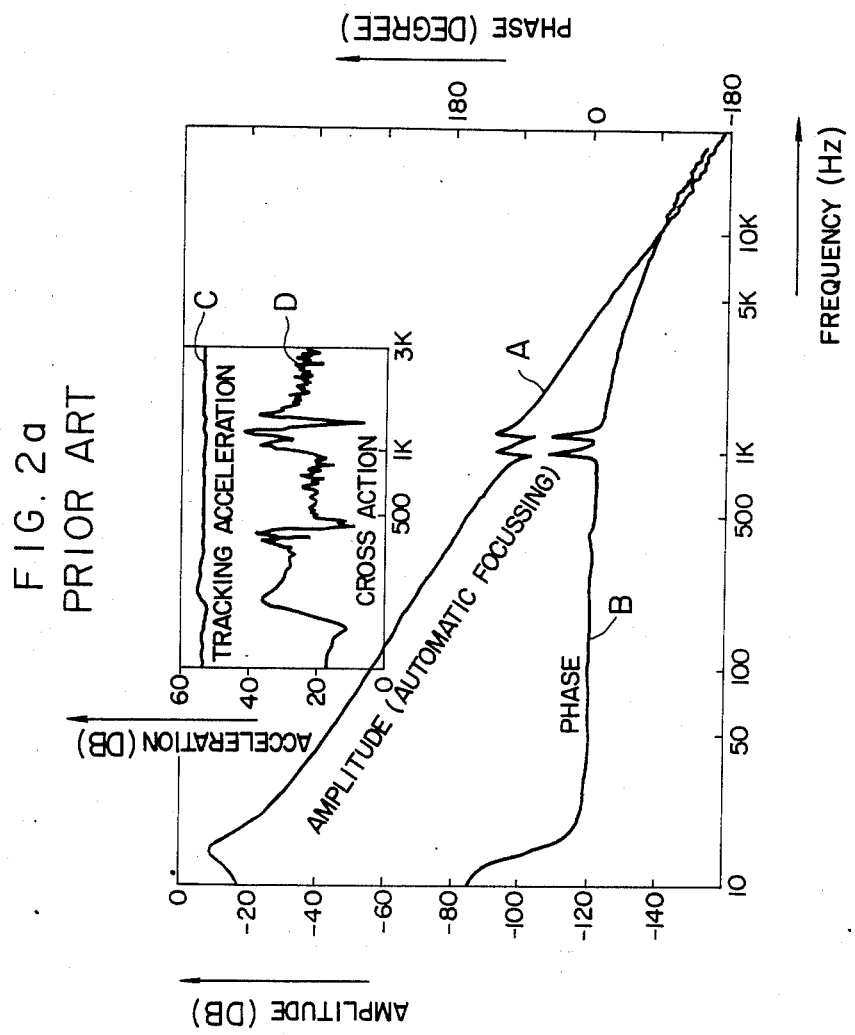
FIG. 2a is a view for illustrating operation characteristics of the apparatus shown in FIG. 1.
Figure 2B:
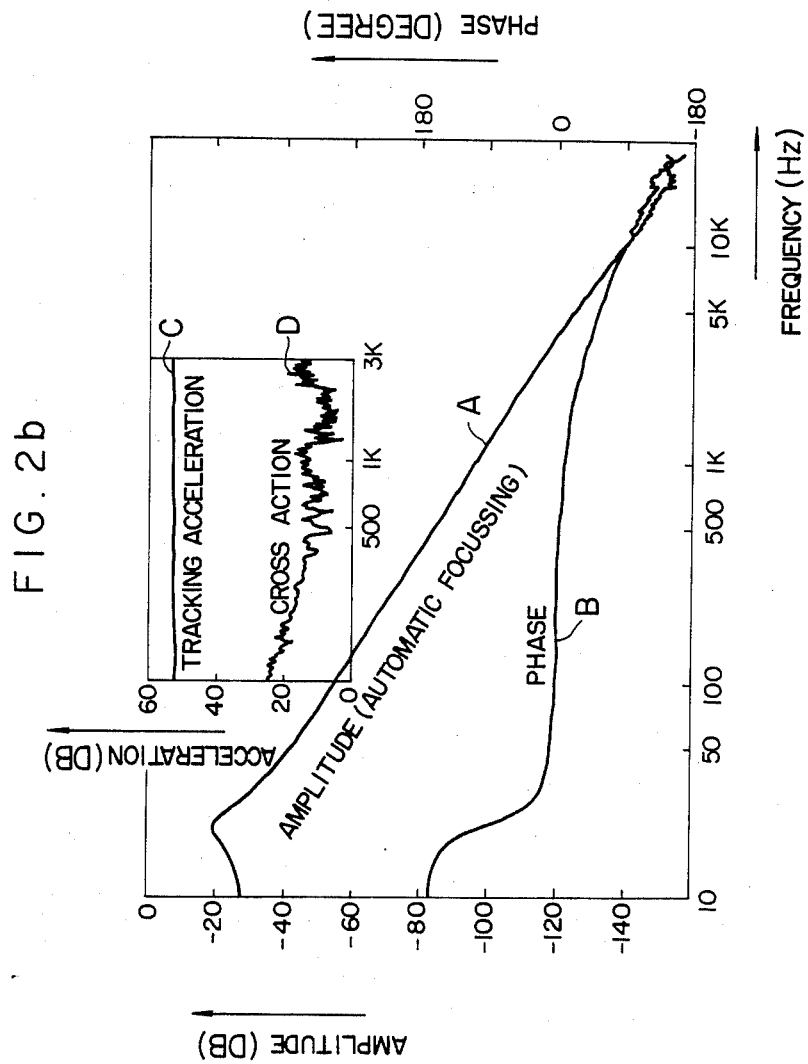
FIG. 2b is a view for graphically illustrating characteristics realized by an objective driving apparatus according to an embodiment of the present invention.
Figure 8B:
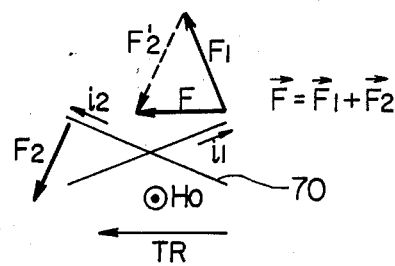
Figure 8C:
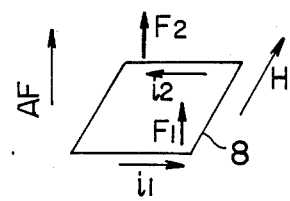

FIGS. 8b and 8c are views for illustrating, respectively, the directions of forces produced, respectively, through cooperation of the currents flowing through the TR coil 70 and the AF coil 8 and a magnetostatic field Ho generated by the magnetic circuit. Referring to FIG. 8b, it will be seen that a resultant force F of forces $F_1$ and $F_2$ ($\approx F_2'$) produced in response to currents $i_1$ and $i_2$ ($=i_1$) flowing through the cross TR coil 70 and acting on latter is in the direction which coincides with the tracking direction. Further, it will be seen in FIG. 8c that a resultant force of force components $F_1$ and $F_2$ is produced in response to currents $i_1$ and $i_2$ ($=i_1$) flowing through the AF coil 8 wound in a rectangular form, wherein the resultant force is in the direction which coincides with the focussing direction, i.e. in the direction corresponding to the optical axis of the objective. The coil springs 55a to 55d undergo deformation or distortion in dependence on magnitude of the resultant force of the different directions, whereby the laser beam transmitted through the objective for data reading or writing will be correctly focussed on the recording medium. FIG. 2b shows the amplitude-frequency characteristic and others obtained by the FIG. 8 embodiment. The curves of the amplitude A and the phase B are flattened and the cross action is reduced as compared with those of prior art shown in FIG. 2a.

FIG. 9 shows another embodiment of the invention. The stationary frame is divided into a pair of frame halves along the direction coinciding with the optical axis of the objective, the frame halves having structures symmetrical to each other. In the case of the instant embodiment shown in FIG. 9, the assembling guide frame is omitted. The frame halves 72a and 72b integrally provided with the coil springs 55a; 55b and 55c; 55d, respectively, can be assembled together in an abutting relation.

FIG. 10 shows in a partially sectioned perspective view the objective lens driving apparatus according to an embodiment of the invention. Referring to the figure, there are fixedly mounted on the base 9 having an opening 88 formed in a center portion, thereof, U-like magnetic yoke plates 3a and 3b and magnetic circuit members 82a and 82b which include magnets 1a and 1b of a rectangular prism magnetic circuit members by means of set screws 83a and 83b from the lower side of the base 9 in such an array that poles of same polarity are located in opposition to each other, e.g. the S-pole of the member 82a faces the S-pole of the member 82b. In one of the magnetic circuit members 82a and 82b, a substrate having a surface printed with a circuit pattern for the control current and a stationary frame 43 are fixedly secured to a side surface of the yoke plate 3b by means of screw 7b. When the screw 7b is removed, the stationary system, including the base 9 and magnetic circuits 82a and 82b can be separated from the vibrating system including the lens 4, the coils 8 and 10 and the suspension coils 55(a; b; c and d). Pins 86a to 86d are mounted in a row on the substrate for constituting electric terminals. Lead wires 56a to 56d extending coaxially through the coil spring supports 55a to 55d, respectively, are connected to the circuit pattern 85 on the substrate 84 by soldering 85a. The driven unit is composed of an objective 4 secured onto a lens holder 6, a focussing coil 8 wound around a lens frame 6 in a rectangular form, and a tracking coil divided into four coil portions 80a to 80d, wherein the coil ends are, respectively, connected to the lead wires 56a to 56d by soldering. The electric current is supplied to the coils by way of the pins 86, the substrate circuit 84 and the lead wires for driving the driven unit in two directions.

The coils are disposed within the magnetic gaps, so that upon electric energization of the focussing coil, the driven unit is displaced in the direction AF while upon electric energization of the tracking coil the driven unit is displaced in the direction TR.

Each of the supporting members 55a to 55d is consituted, for example, by a closely wound spring coil having an inner diameter of 0.5 mm which is realized by winding closely a phosphor bronze wire of 0.1 mm in diameter. A phosphor bronze wire of 0.1 mm in diameter is coaxially inserted in the closely wound coil spring and secured in position by filling both ends of the coil spring with RTV rubber compound which is commercially available under trade name "KE-347" from Shinetsu Chemical Company in Japan. Needless to say, any equivalent filling or bonding material may be employed to this end. The focussing coil is realized in a rectangular form in four stacked layers each composed of 160 turns of an aluminum wire of 0.1 mm in diameter. The ohmic resistance of the focussing coil is ca. 221 $\Omega$. The tracking coil is composed of a series of four sub-coils each constituted by 25 turns of flat enameled wire of 0.03×0.25 mm in cross section. Each of the four sub-coils connected in series is disposed on each side of the rectangular focussing coil, the coil assembly thus realized being placed within the magnetic field for driving the driven unit in the focussing direction AF as well as in the tracking direction TR. The ohmic resistance of the tracking coil is about 4.4 $\Omega$.

For balancing the driving force relative to the center of gravity of the driven unit, a balancing weight 89 is used. The total weight of the driven unit inclusive of the balancing weight is about 2 g.

In contrast to the characteristics of the hitherto known actuator shown in FIG. 1 where in $F_0=23.5$ Hz and $Q_0=17.2$ in the tracking operation while in the focussing mode $f_0=14.2$ Hz, $Q_0=4.8$ and cross action is $-6$ dB, the characteristics of the actuator shown in FIG. 10 are such that $f_0=31.5$ Hz, $Q_0<9$, in the tracking mode and that $f_0=31.5$ Hz, $Q<4$ and the cross action is of $-33$ dB in the focussing mode.

Figure 11:
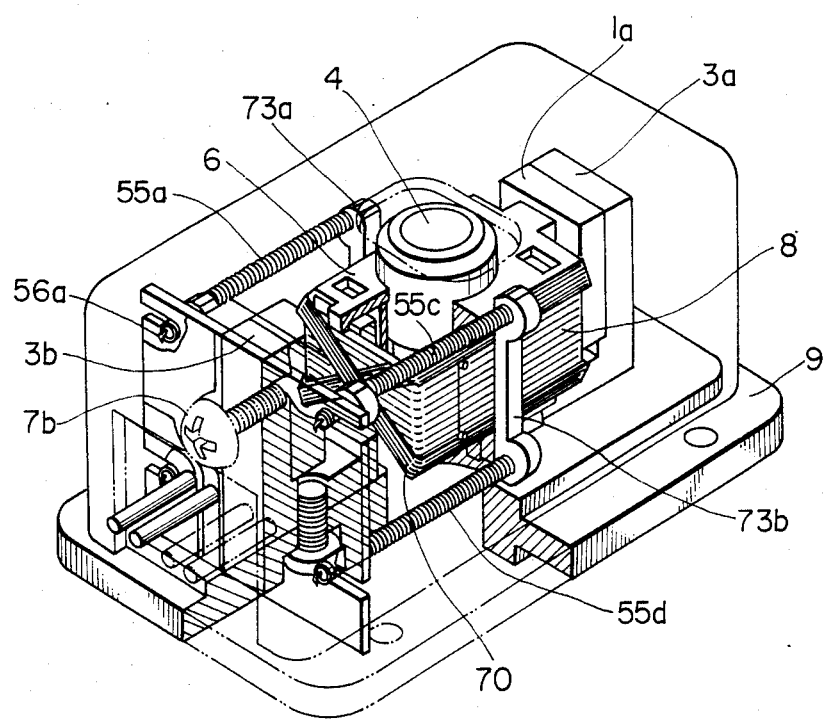

FIG. 11 shows another embodiment. The illustrated actuator is composed of the driven unit mounting structure (73a, 73b) shown in FIG. 9 and the cross tracking coil 70 (0.08 mm$\phi$ enameled wire 26 T each) shown in FIG. 8a (AF coil: 194 T in four. The structure and operation of this actuator will be appreciated from the descriptions made for FIGS. 9 and 8a.

Figure 12A:
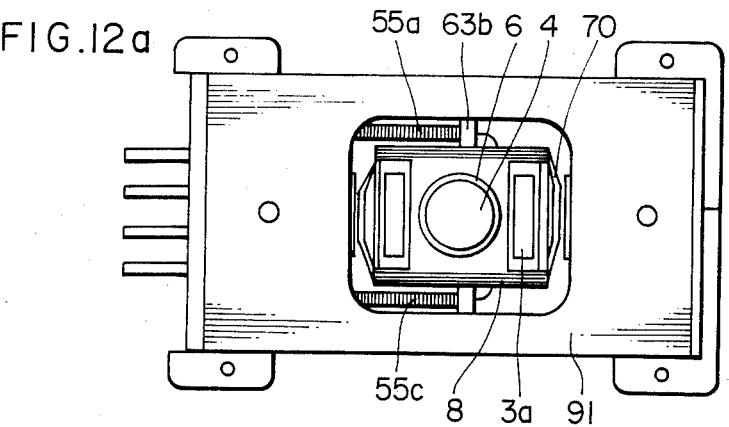
FIGS. 12a to 12c, FIGS. 13a to 13c, FIGS. 14, 15, 16a and 16b are views showing other exemplary embodiments of the invention.
Figure 12B:
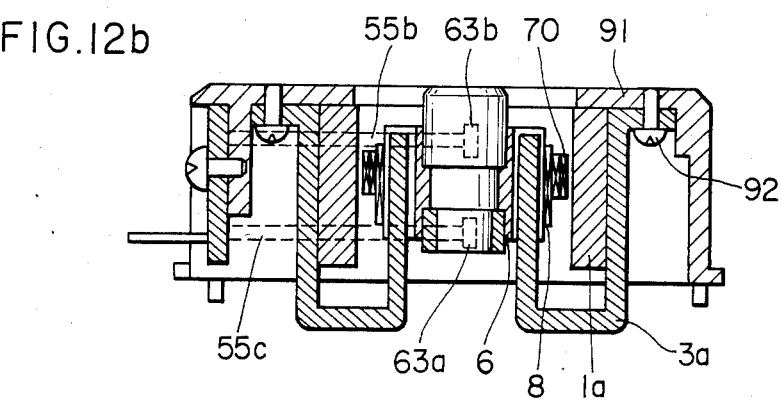
Figure 12C:
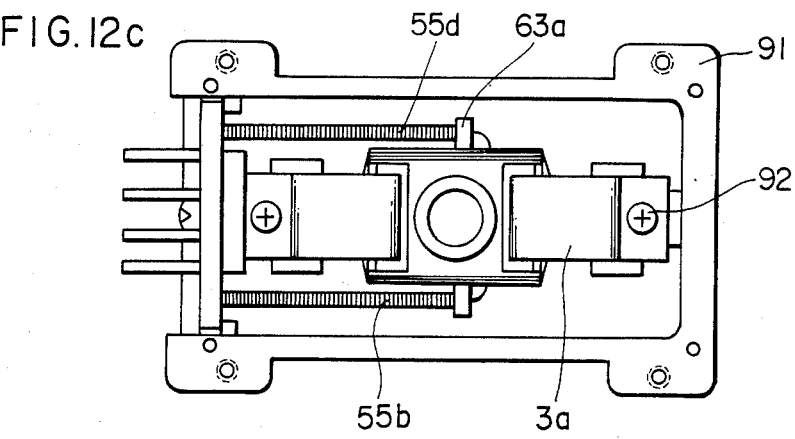

FIGS. 12a to 12c show a further embodiment of the invention. In the case of this actuator, the magnetic yoke 3a is mounted on a protection cover 91 by means of set screws 92, wherein the mount base 9 (FIG. 1) is omitted so that the bottom of the actuator is wholly exposed. This embodiment is advantageous in that the inexpensive cover 91 which can be easily fabricated and mounted serves for the function of the base 9.

Figure 13A:
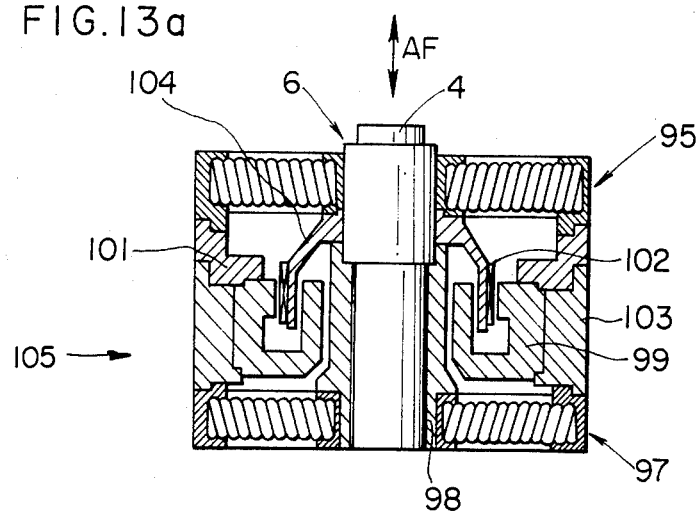
Figure 13B:
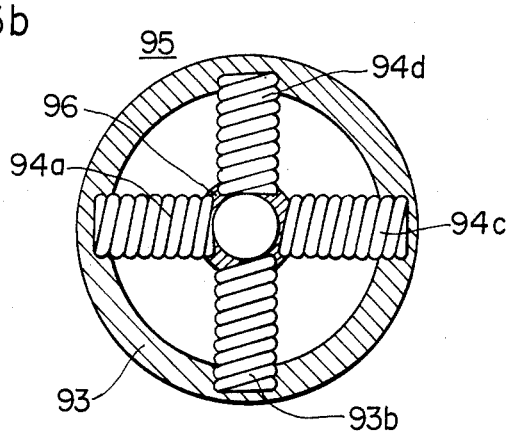

FIGS. 13a and 13b show a one-dimensional actuator according to a further embodiment of the invention, wherein the objective system 4 supported by the coil springs is adapted to be displaced only in the direction AF for controlling the position of the focussed light spot.

More specifically, there is shown in FIG. 13b an objective supporting assembly 95 which comprises four coil springs mounted integrally between an outer ring frame 93 and an inner ring frame 96 in a radial pattern. On the other hand, FIG. 13a shows the one-dimensional actuator 105 in which a magnetic circuit member 99, an enclosing mounting frame 103 and a clamping member 101 which cooperates with the frame 103 to hold fixedly the magnetic circuit member 99 are disposed between a pair of upper and lower supporting assemblies each having the structure shown in FIG. 13b. A sleeve 98 is fitted in the lens holder 6 for supporting the objective 4. A coil holder 104 having the driving coil assembly 102 mounted thereon is in turn mounted on the lens holder 6. It should be mentioned that the elements attached with even reference numerals are driven in the direction AF coinciding with the optical axis of the objective under electromagnetic force produced by the current flowing through the driving circuit and magnetostatic field generated by the magnetic circuit 99 which is supported by those aforementioned elements which are denoted by odd reference numerals.

Figure 13C:
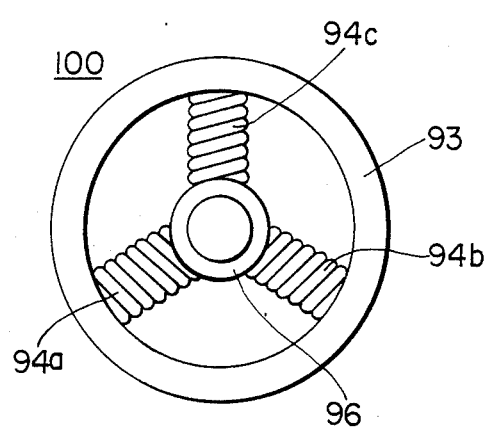

FIG. 13c shows a version of the supporting assembly shown in FIG. 13b. It will be seen that the illustrated driving assembly generally denoted by 100 includes three coil springs 94a, 94b and 94c mounted integrally between the outer and inner rings 93 and 96. A pair of the supporting assemblies 100 are incorporated in the one-dimensional actuator in the manner shown in FIG. 13a.

Figure 14:
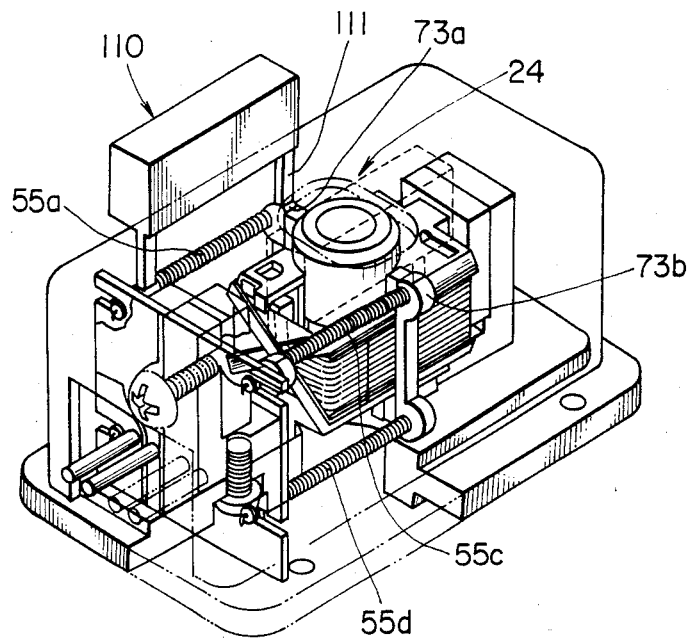

FIG. 14 is a view showing still another embodiment of the invention. Description of those elements or members which are same as those shown in FIG. 11 will be omitted. The coil spring 55a is previously mounted when a driven unit mount member 73a is integrally formed with a mounting guide 110 having a portion 111 at which the guide 110 is cut away later on. Accordingly, upon assembling of the structure shown in FIG. 14, the end portions of the coil springs 55a and 55b (latter not shown) are prevented from moving or vibrating freely when the coil springs are connected to the driven unit 24. The mounting guide 110 may be of such a size and a shape which can be gripped easily by an assembling robot hand. The mounting guide (not shown) provided also for the spring coils 55c and 55d and the mount 73b is of a structure similar to the mounting guide 110. As described earlier, these guides are cut away at the portions 111 after the assembly has been completed.

Figure 15:
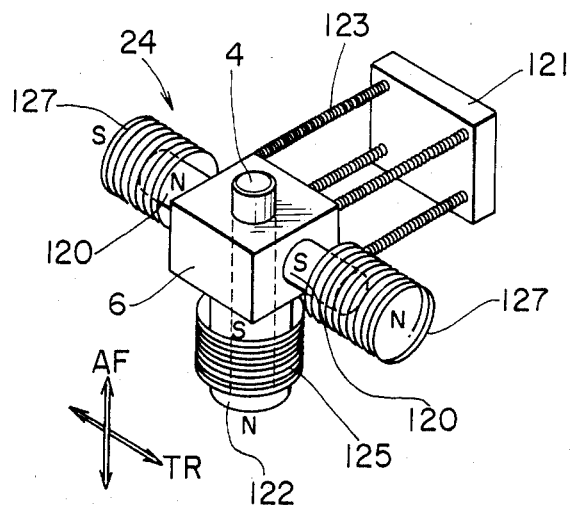

FIG. 15 shows still another embodiment of the invention.

In the case of the various embodiments described in the foregoing, the driving current is supplied to the driving coil 102 or TR coil 70 or AF coil 8 installed on the driven unit which is suspended by the coil springs within a space defined by the magnetic circuit. It should be noted that the aformentioned relation between the magnetic circuit and the driving coils may be reversed. Now, referring to FIG. 15, the driven unit including an objective 4 and a lens holder 6 is fixedly provided with a pair of tracking (TR) magnets 120 and a focussing (AF) magnet 122 and suspended by a plurality of suspension coil springs 123. Each of the magnets may be of a cylindrical or prismatic or other suitable configuration and is magnetized in the direction in which the objective is displaced. For example, the AF magnet 122 is magnetized in the direction AF shown in FIG. 15 which corresponds to the optical axis of the objective 4. The focussing (AF) coil 125 secured to a base (not shown) by means of a suitable member is disposed around the AF magnet 122 with a distance therefrom. Under an electromagnetic force produced through cooperation of the driving current of the coil 125 and the magnetic field of the magnet 122, the driven unit 24 is actuated or displaced in the direction AF. The actuation of the driven unit in the direction TR may be effected in the similar manner. For preventing the TR coil 127 from colliding with the TR magnet upon actuation of the driven unit in the direction AF, it is desirable that the individual driving coils be realized in a significantly greater size than the associated magnets or be wound in an elliptical cylinder in place of the circular cylindrical form. Although the illustrated actuator of the so-called moving magnet type is of a two-dimensional structure, it will readily occur to those skilled in the art to implement a one-dimensional actuator of the moving magnet type in light of the structure shown in FIG. 13a without departing from the concept of the present invention.

Figure 16A:
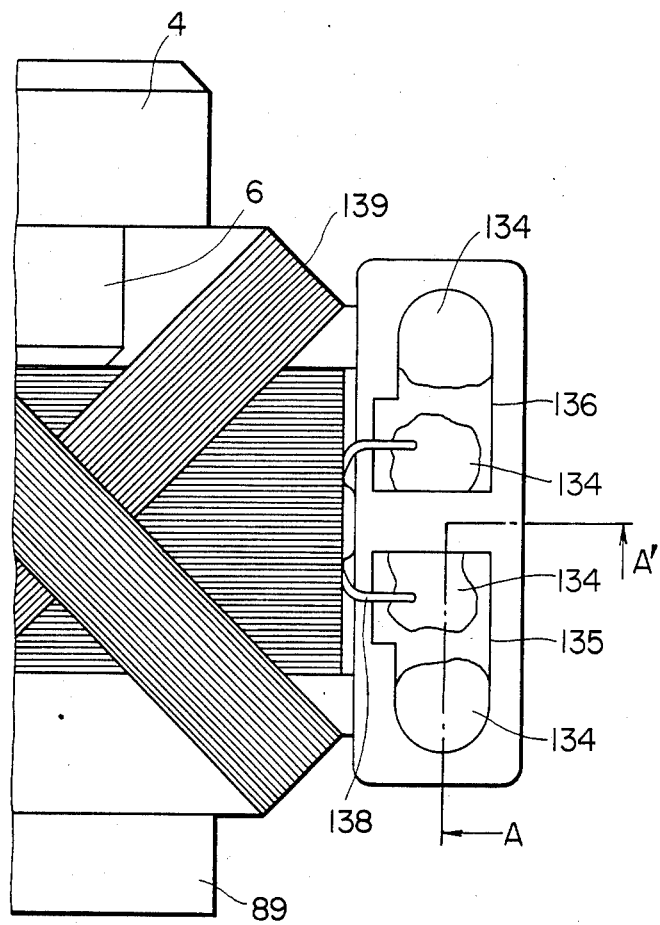
Figure 16B:
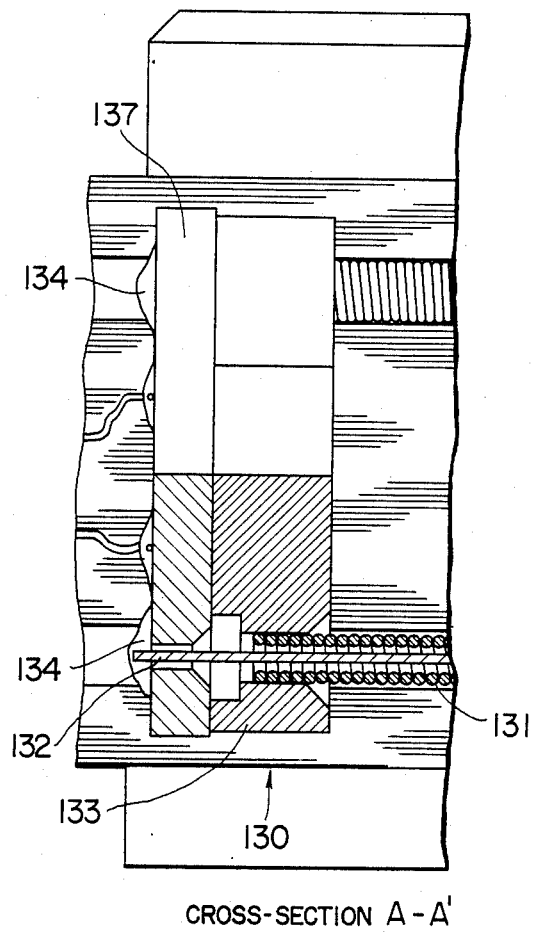

FIGS. 16a and 16b show another embodiment employing a composite spring 130 including a coil spring 131 and a center wire 132 passed therethrough, ends of them are fixed in a stationary frame 133. The center wire is also connected through soldering portion 134 and a printed pattern 135 provided on a circuit board 137 to a focusing coil 138. A tracking coil 139 can be connected to a soldering portion not shown. The spring modulus K of the spring composite 130 is the sum of the spring moduli $K_1$ and $K_2$ of the coil spring 131 and the center wire 132. A free action of the coil spring 131 is effectively suppressed by the wire 132, providing a benefit for assembling the driven unit. Preferrable relation between them for this purpose is presented by the following equation:

$$K_2/K_1 = 2 \text{ to } 5.$$

In this case, the coil spring 131 can be made of an insulator.

On the contrary, the coil spring 131 only may be conductive if it is connected electrically to the soldering portion 134. Of course both the coil spring 131 and the wire 132 may be conductive and connected to each other.

We claim:
1. An optical system driving apparatus, comprising:
   (a) an optical system including at least one lens;
   (b) at least one set of a current conducting coil and a magnet for producing an electromagnetic force for driving said optical system; and
   (c) a plurality of conductive coil springs for supressing undesirable resonance otherwise produced in the driving of the optical system and for enabling energization of said current conducting coil, each of said coil springs having one end mounted on a stationary part and another end mounted on said optical system;
   (d) wherein either one of said current conducting coil or magnet is mounted on said optical system while the other is mounted on said stationary part.
2. An optical system driving apparatus according to claim 1, wherein each of said coil springs is closely wound and exhibits an initial tension of 1 to 15 gf.
3. An optical system driving apparatus according to claim 1, wherein end portions of said coil springs are fixedly secured in an integral structure.
4. An optical system driving apparatus according to claim 2, wherein an electromagnetic force produced by one of said coil and magnet sets is of a direction coinciding with the optical axis of said optical system so that said optical system is vibrationally driven in response to the current flowing through said coil.
5. An optical system driving apparatus according to claim 2, wherein each of said coil springs includes an electrically non-conductive material such as polymer forming a spring coil and a lead wire extending through the interior space of said spring coil.
6. An optical system driving apparatus according to claim 5, wherein said interior space is filled with a viscoelastic material.
7. An optical system driving apparatus according to claim 2, further comprising:
   (a) four of said coil springs disposed substantially in parallel with one another in a direction orthogonal to the optical axis;
   (b) first and second stationary frames each of which has two of said coil springs mounted integrally at both ends,
   (c) positioning guides each provided at an abutting end face of each of said two stationary frames, said abutting end face extending perpendicularly to the optical axis;
   (d) recessed portions formed in said frames for separating portions of said frames from those portions thereof at which said coil springs are integrally mounted at both ends, after both of said frames have been assembled in an abutting relation with said optical system being interposed between said frames.
8. An optical system driving apparatus according to claim 7, wherein those of said coil springs which are located in diametrical opposition to each other are wound in a same direction, while those of said coil springs which are located at opposite sides are wound in the counter direction.
9. An optical system driving apparatus according to claim 4, further comprising a second set of a current conducting coil and a magnet for producing an electromagnetic force in a direction substantially orthogonal to said optical axis and the axes of said coil springs.
10. An optical system driving apparatus according to claim 4, wherein said coil springs are disposed in a radial pattern between an outer ring and an inner ring in a direction substantially orthogonal to said optical axis, said coil springs being fixedly secured at both ends to said inner and outer rings.

11. An optical system driving apparatus for use in an optical information system in which a light beam is focussed on a data recording medium for reading and/or writing data, said optical system driving apparatus serving for controlling the focussed position of said light beam in conformance with movement of said recording medium and comprising:
   (a) a drivable optical system having lenses for transmitting said light beam;
   (b) magnetic circuit means disposed stationarily;
   (c) a current conducting coil disposed so as to enclose said optical system for producing upon electrical energization electromagnetic force for driving said optical system in a direction substantially orthogonal to the axes of a plurality of closely wound coil springs through cooperation with said magnetic circuit means, said coil springs suppressing undesired resonance otherwise produced in the driving of said optical system, each of said coil springs having one end fixedly secured and extending in a direction substantially orthogonal to said light beam;
   (d) means for fixedly securing said coil springs to said optical system; and
   (e) means for electrically conncecting said current conducting coil and said coil springs, said coil springs being cconductive for enabling energization of said current conducting coil.

12. An optical system driving apparatus, comprising:
   an optical system including at least one lens;
   driving means for driving said optical system, said driving means having at least one set of current conducting coil and a magnet; and
   spring coils closely wound in a cylindrical form and having an initial tension of 1 to 15 gf for supressing undesired resonance otherwise produced in the driving of said optical system, each of said spring coils having one end mounted on a stationary part and another end connected to said optical system to support said optical system, each of said spring coils being conductive.

13. An optical system driving apparatus according to claim 12, further comprising:
   a first set of a current conducting coil and a magnet for producing a first electromagnetic force (AF), wherein either one of said coil or said magnet is fixedly mounted, while the other is mounted on said optical system so that said optical system is vibrationally driven in the direction corresponding to the optical axis of said optical system in response to the current flowing through said coil.

14. An optical system driving apparatus according to claim 13, further comprising:
   a second set of a current conducting coil and a magnet for producing a second electromagnetic force (TR) in a direction substantially orthogonal to said first electromagnetic force;
   wherein said closely wound spring coil are disposed in a direction extending substantially orthogonally to said first and second electromagnetic forces.

15. An optical system driving apparatus, comprising:
   (a) an optical system including at least one lens;
   (b) at least one set of a current conducting coil and a magnet for producing an electromagnetic force for driving said optical system;
   (c) a plurality of coil springs for supressing undesirable resonance otherwise produced in the driving of the optical system, each of said coil springs having one end mounted on a stationary part and another end mounted on said optical system, each of said coil springs including an electrically non-conductive material such as polymer forming a spring coil and a lead wire extending through the interior space of said spring coil for enabling energization of said current conducting coil;
   (d) wherein either one of said current conducting coil and said magnet is mounted on said optical system and the other is mounted on said stationary part.

16. An optical system driving apparatus according to claim 15, wherein each of said coil springs is closely wound and exhibits an initial tension of 1 to 5 gf.

* * * * *